United States Patent Office 2,891,078
Patented June 16, 1959

2,891,078

6α,17α-DIALKYL-17-HYDROXY-19-NOR-4-ANDROSTEN-3-ONES

Frank B. Colton, Chicago, and Norman W. Atwater, Des Plaines, Ill., assignors to G. D. Searle & Co., Chicago, Ill., a corporation of Delaware No Drawing. Application January 24, 1958
Serial No. 710,858

3 Claims. (Cl. 260—397.4)

The present invention relates to a new group of highly active progestational agents and, more particularly, to 17β - hydroxy - 6α,17 - dialkyl - 19 - nor - 4 - androsten - 3-ones of the general structural formula

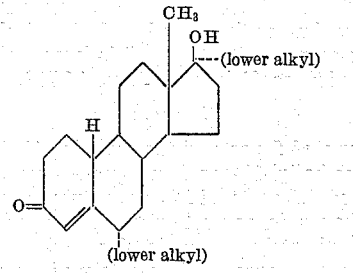

In the foregoing structural formula the lower alkyl group in the 6-position can be methyl, ethyl, propyl, butyl, amyl, and hexyl but for use as progestational agents we prefer the lower members of this series and particularly the methyl derivative. The lower alkyl group in the 17-position can be a group such as ethyl, propyl, isopropyl, butyl, secondary butyl, isobutyl, straight-chain or branched amyl, hexyl, and the like.

The compounds of this invention are highly potent progestational agents. It has been found that introduction of the 6-alkyl group increases the progestational activity to a great extent. The compounds have low androgenic activity and do not antagonize the effect of the mineralocorticoid hormone, desoxycorticosterone.

The compounds of this invention are conveniently prepared by the dehydration of the corresponding saturated 5-hydroxy derivatives. Alternatively, the 17-alkyl derivatives of this invention can be obtained by the catalytic hydrogenation of the corresponding 17-alkenyl derivatives. The said 17-alkenyl derivatives will be made the subject matter of a separate application. These 17-alkenyl compounds are also highly active progestational agents but they lack the anabolic activity of the compounds of the present invention.

The compounds which constitute this invention and the methods for their preparation will appear more fully from the consideration of the following examples which are given for the purpose of illustration only and are not to be construed as limiting the invention in spirit or in scope. In these examples, quantities are indicated in parts by weight.

Example 1

To a solution of 40 parts of 17β-hydroxy-17-ethyl-19-nor-4-androsten-3-one in 1240 parts of benzene are added 450 parts of ethylene glycol and 0.4 part of p-toluenesulfonic acid monohydrate and the mixture is stirred and refluxed for 12 hours with a water separator in the vapor path. Then 10 parts of solid sodium bicarbonate in 1500 parts of water are added. The benzene layer is separated, washed with water, dried over anhydrous sodium sulfate and then applied to a chromatography column containing 1800 parts of silica gel. The column is developed with benzene and a 2% solution of ethyl acetate in benzene. Elution of the column with a 5% solution of ethyl acetate in benzene, concentration of the eluate and crystallization of the residue from methanol and petroleum ether yields 3 - ethylenedioxy - 17α - ethyl - 19 - nor - 5 - androsten - 17-ol melting at about 113–114° C.

Example 2

A solution of 10 parts of 3-ethylenedioxy-17α-ethyl-19-nor-5-androsten-17-ol in 110 parts of benzene is treated with 5 parts of anhydrous sodium acetate and a solution of 2 parts of perbenzoic acid in 110 parts of benzene. The mixture is stirred at room temperature for 2 hours and is then washed repeatedly with a 10% aqueous sodium carbonate solution. The benzene layer is then washed with water, dried over anhydrous sodium sulfate, filtered and concentrated under vacuum. The residue is crystallized from a mixture of methanol and water and then from isopropyl ether. There is thus obtained 3-ethylenedioxy - 5α,6α - oxido - 17α - ethyl - 19 - nor-androstan-17-ol melting at about 148–149° C.

Example 3

A solution of 35 parts of 3-ethylenedioxy-5α,6α-oxido-17α-ethyl-19-norandrostan-17-ol in 4500 parts of tetrahydrofuran is treated with a solution of 12 parts of methylmagnesium bromide in 450 parts of diethyl ether. Solvent is distilled from the reaction mixture until the mixture reaches a temperature of 60° C. and then it is refluxed for 20 hours. An equal volume of water is added and the phases are separated. The aqueous layer is extracted with ether and with a 50% solution of ethyl acetate in ether and then the combined organic solutions are washed with saturated aqueous sodium chloride. After drying over anhydrous sodium sulfate, the solvents are removed by evaporation and the residue is crystallized from isopropyl ether. The 3-ethylenedioxy-6β-methyl-17α-ethyl-19-norandrostan-5α,17-diol thus obtained melts at about 167.5–168.5° C.

Example 4

A solution of 15 parts of 3-ethylenedioxy-6β-methyl-17α-ethyl-19-norandrostane-5α,17-diol in 84 parts of glacial acetic acid and 20 parts of water is heated on the steam bath for 45 minutes after which the reaction mixture is poured into 3 volumes of water. The solid reaction product is collected on a filter and recrystallized from isopropyl ether to yield 5α,17β-dihydroxy-6β-methyl-17-ethyl-19-norandrostan-3-one melting at about 217–221.5° C.

Example 5

A solution of 18 parts of 5α,17β-dihydroxy-6β-methyl-17-ethyl-19-norandrostan-3-one and 20 parts of potassium hydroxide in 1400 parts of methanol and 200 parts of water is refluxed for 18 hours. The solution is poured into 3 volumes of water and the mixture is extracted with diethyl ether. The extracts are washed with water, dried over anhydrous sodium sulfate, filtered and evaporated. The residue is purified by chromatography on 1500 parts of silica gel. The column is developed with benzene and a benzene solution containing 5% of ethyl acetate. Elution with a 10% solution of ethyl acetate in benzene, concentration of the eluate and crystallization of the residue from isopropyl ether yields 17β-hydroxy-6α- methyl-17-ethyl-19-nor-4-androsten-3-one which melts at about 131–135° C. It has the structural formula

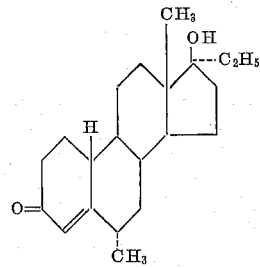

Example 6

For the 17β-hydroxy-17-ethyl-19-nor-4-androsten-3-one used in Example 1, there are substituted 42 parts of 17β-hydroxy-17-propyl-19-nor-4-androsten-3-one. The reactions are carried out as in the preceding five examples and there is obtained 6α-methyl-17α-propyl-17-hydroxy-19-nor-4-androsten-3-one. The infrared absorption spectrum of this compound shows maxima at 2.70, 5.98 and 6.17 microns. An ultraviolet maximum is observed at 241 millimicrons with a molecular extinction coefficient of 16,800.

Example 7

Forty parts of 17β-hydroxy-19-nor-4-androsten-3-one are substituted for the 17α-ethyl derivative of Example 1. Then, using the procedures of Examples 1 and 2, there is obtained the 3-ethylenedioxy-5α,6α-oxido-19-norandrostan-17β-ol.

A solution of 7 parts of this oxide in 900 parts of tetrahydrofuran is treated with a solution of 2.65 parts of ethylmagnesium bromide in 90 parts of diethyl ether. The solvent is removed from the reaction mixture until a temperature of 60° C. is reached and then the mixture is refluxed for 24 hours. An equal volume of water is then added and the phases are separated. The aqueous layer is extracted with ether and the combined organic solutions are washed with aqueous sodium chloride, dried over anhydrous calcium sulfate, filtered and evaporated. The residue is recrystallized from isopropyl ether. There is thus obtained 3-ethylenedioxy-6β-ethyl-19-norandrostan-5α,17β-diol.

Substitution of a solution of 2.4 parts of methylmagnesium bromide yields the corresponding 6β-methyl homolog.

Example 8

To a solution of 10 parts of one of the 3-ethylenedioxy-6β-alkyl-19-norandrostane-5α,17β-diols, prepared by the procedure of the preceding example, are added 5 parts of aluminum isopropylate, 83 parts of anhydrous cyclohexanone and 450 parts of toluene and the mixture is refluxed in a nitrogen atmosphere for 3 hours. Saturated Rochelle salt solution is added portionwise over a 10-minute period and the mixture is steam distilled. The product is separated from the aqueous residue by filtration and triturated with methanol. On cooling there is obtained the 3-ethylenedioxy-5α-hydroxy-6β-alkyl-19-norandrostan-17-one.

To a stirred mixture of 3.4 parts of magnesium turnings in 150 parts of ether there are added 25 parts of methallyl bromide in 100 parts of ether. Then 4 parts of the 3-ethylenedioxy-5α-hydroxy-6β-alkyl-19-norandrostan-17-one in 150 parts of ether are added and the reaction mixture is refluxed for 3 hours. A solution of 20 parts of Rochelle salt in 200 parts of water is then cautiously added with efficient stirring. The ether layer is separated, washed with water, dried over sodium sulfate and filtered.

The residue obtained by concentration of the filtrate is recrystallized from a mixture of ether and methanol to yield a product which is predominantly the 3-ethylenedioxy - 6β - alkyl - 17α - methallyl - 19 - norandrostan - 5α,17-diol.

A solution of 3 parts of the 3-ethylenedioxy-6β-alkyl-17α-methallyl-19-norandrostane-5α,17-diol in 17 parts of glacial acetic acid and 4 parts of water is heated on the steam bath for 30 minutes and poured into 3 volumes of water. The solid product is collected on a filter and recrystallized from isopropyl ether. A solution of 3.5 parts of the resulting 5α,17β-dihydroxy-6β-alkyl-17-methallyl-19-norandrostan-3-one and 4 parts of potassium hydroxide in 280 parts of methanol and 40 parts of water is refluxed for 24 hours and then poured into 3 volumes of water. The mixture is extracted with ether and the ether extracts are washed with water, dried over anhydrous calcium sulfate, filtered and evaporated. The residue is purified by chromatography over silica gel by the method of Example 5.

The 17β - hydroxy - 6α - methyl - 17 - methallyl - 19 - nor-4-androsten-3-one thus obtained shows infrared maxima at 2.75, 6.00 and 6.19 microns. An ultraviolet maximum at 241 millimicrons has a molecular extinction coefficient of about 17,000. The 6α-ethyl derivative shows infrared maxima at the wave lengths listed above and an ultraviolet maximum at 241 millimicrons with a molecular extinction coefficient of about 16,700.

Example 9

A mixture of 5 parts of the resulting 17β-hydroxy-6α-alkyl-17-methallyl-19-nor-4-androsten-3-one, 100 parts of dioxane and 1.5 parts of 5% palladium on charcoal catalyst is shaken in contact with a hydrogen atmosphere until approximately one molecular equivalent of hydrogen has been consumed. The catalyst is removed by filtration and the filtrate is concentrated under reduced pressure. When the residue obtained by vaporization of the solvent is recrystallized repeatedly from a mixture of acetone and petroleum ether there is obtained the 17β-hydroxy - 6α - alkyl - 17 - isobutyl - 19 - nor - 4 - androsten-3-one. The ultraviolet absorption spectrum of the 6-methyl derivative shows a maximum at about 241 millimicrons with a molecular extinction coefficient of 16,800. The maximum of the 6-ethyl derivative also has an extinction coefficient of 16,800. Infrared maxima are observed in the case of both of these compounds at 2.73, 5.99 and 6.18 microns.

What is claimed is:

1. A compound of the structural formula

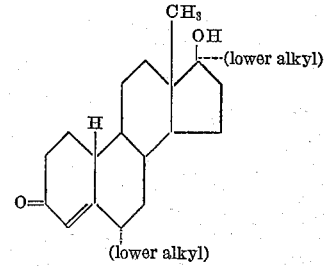

2. 17β - hydroxy - 6α - methyl - 17 - ethyl - 19 - nor - 4-androsten-3-one.

3. 17β - hydroxy - 6α - methyl - 17 - (lower alkyl) - 19-nor-4-androsten-3-one.

References Cited in the file of this patent

UNITED STATES PATENTS

| | | |
|---|---|---|
| 2,721,871 | Colton | Oct. 25, 1955 |
| 2,774,777 | Djerassi et al. | Dec. 18, 1956 |